Sept. 28, 1943.    T. W. DWELLE    2,330,342
SPEED CONTROLLER
Filed May 23, 1939    2 Sheets-Sheet 1

INVENTOR.
THOMAS W. DWELLE.
BY
ATTORNEY.

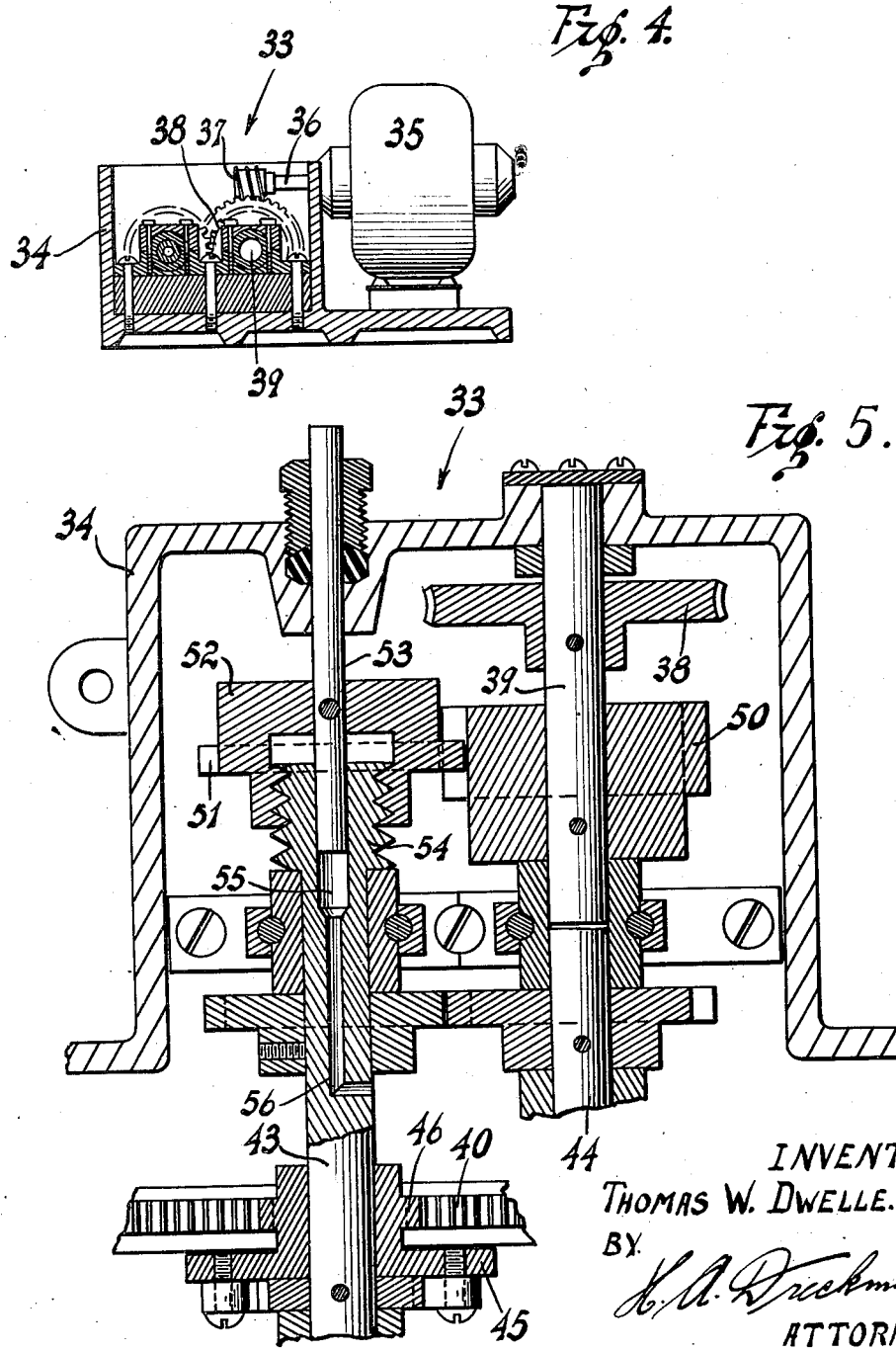

Patented Sept. 28, 1943

2,330,342

UNITED STATES PATENT OFFICE 2,330,342

SPEED CONTROLLER

Thomas W. Dwelle, Bakersfield, Calif.

Application May 23, 1939, Serial No. 275,162

1 Claim. (Cl. 264—9)

This invention relates to a speed controller, whereby the speed of various rotating prime movers, such as turbines, steam or internal combustion engines, or the like, may be controlled, or in modified form, the stroke or reciprocation of devices, such as a pump, may be controlled.

An object of my invention is to provide a novel speed controller, in which a prime mover drives a shaft. A second shaft is driven at a constant rate of speed by a suitable source of power, any variation in the speeds of the two shafts being transmitted through suitable movement to a control for the prime mover, such as a valve, or the like.

Another object is to provide a novel speed controller, which will control a reciprocating mechanism, such as a pump, through means connecting a shaft driven at constant speed, and a second shaft driven by the pump engine, or the like, any variation in the speeds of the two shafts causing the pump engine to be controlled by increasing or decreasing its speed.

Another object is to provide a novel speed controller of the character stated, in which the speed of the controlled mechanism is held within close limits, the speed controller being relatively simple in construction and effective in operation.

Other objects, advantages and features of invention may appear from the accompanying drawings, the subjoined detailed description, and the appended claim.

In the drawings:

Figure 4 is a sectional view taken on line 4—4 of Figure 6.

Figure 5 is a fragmentary, horizontal, sectional view through the shaft drive mechanisms.

Figure 1:
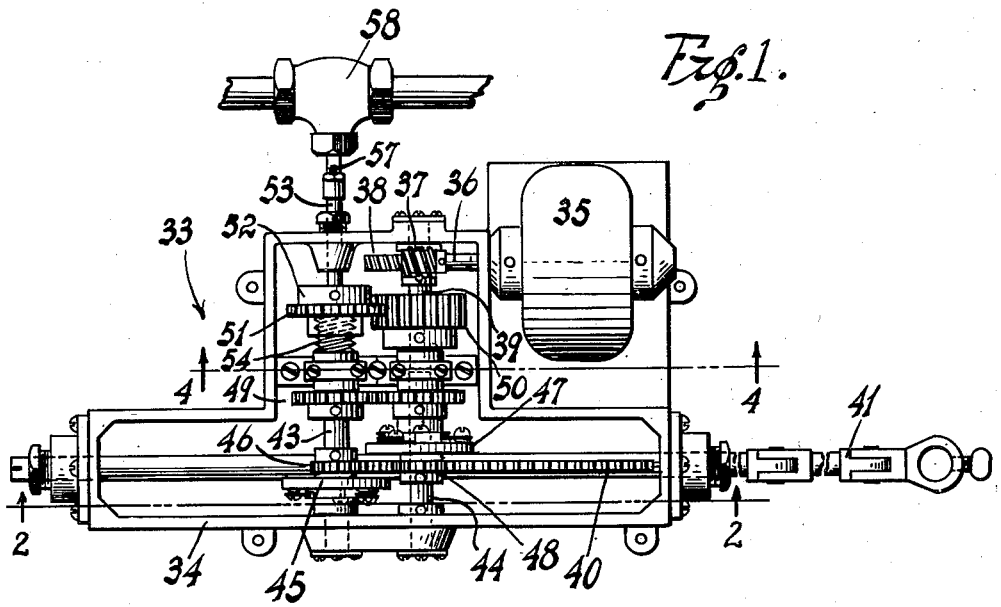
Figure 1 is a plan view of my speed controller, applicable to reciprocating mechanisms, with the cover plate removed.
Figure 2:
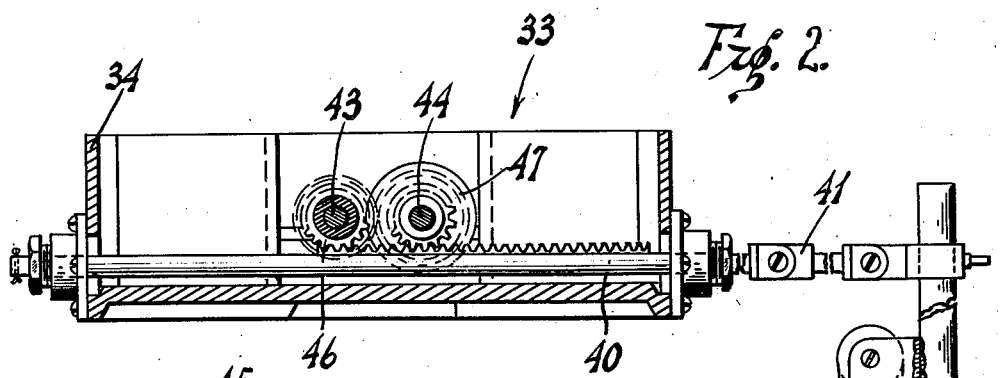
Figure 2 is a sectional view taken on line 2—2 of Figure 1.
Figure 3:
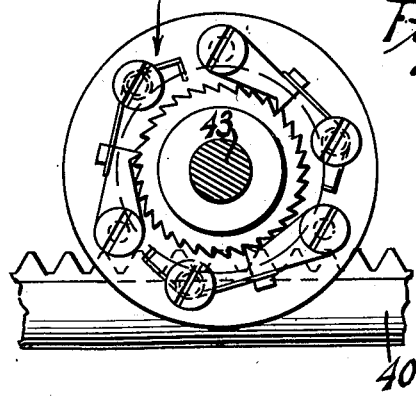
Figure 3 is an enlarged end view of one of the ratchet wheels, a fragment of the ratchet being shown in elevation.

In the form of my invention shown in the accompanying drawings, a reciprocating device such as a steam actuated pump is shown, and the device consists primarily of an electric motor, which paces the pump, and through the mechanism, which will be hereinafter described, will open the steam control valve when the pump is running slower than the desired speed, and will close the control valve when the pump runs faster than desired. The reciprocating speed controller 33 comprises a case or housing 34, which encloses the governing mechanism and is preferably partially filled with oil to effectively lubricate this mechanism. A motor 35, preferably positioned on the outside of the housing 34, rotates at a constant speed, and the shaft 36 of the electric motor extends into the housing, and a gear 37 on the shaft meshes with a gear 38 attached to the shaft 39, which is journaled in the housing 34. A rack 40 is reciprocally mounted in the housing 34, and suitable linkage 41 connects the rack with the oscillating arm 42 of the pump. The linkage 41 is adjustable on the oscillating arm 42, whereby the stroke of the rack 40 can be controlled. A pair of shafts 43 and 44 are journaled in the housing 34, and are arranged parallel and preferably in the same horizontal plane. The shaft 44 is preferably in axial alignment with the shaft 39, as shown in Figure 5.

A unidirectional clutch 45 of usual and well-known construction is mounted on the shaft 43, and this clutch is rotated from the rack 40 through the gear 46, which meshes with the rack. The clutch 45 will rotate the shaft 43 when the rack 40 is moving towards the right, as viewed in Figure 1. The shaft 43 is free of the rack drive when the rack 40 moves to the left. The shaft 44 is provided with a unidirectional clutch 47, and this clutch engages the shaft to rotate the same when the rack 40 moves to the left, the drive being through the gear 48. The shaft 44 is geared to the shaft 43 through the meshing gears 49, 49' attached to the shafts 43 and 44 respectively. The gear 49 is an idler gear, inserted to maintain a uni-directional rotation of the shaft 43. Thus, it will be evident that the shaft 43 is constantly rotated in one direction, while the rack 40 reciprocates in the housing. A gear 50, which has a wide tooth face, is fixedly attached to the shaft 39. This gear is engaged by the ring gear 51 on the housing 52. This housing is fixedly attached to the control trunnion 53, which is rotatably and slidably mounted in the housing 34. The shafts 39, 44 and 43 all have no end movement but merely rotate as described. A threaded head 54 on the end of the shaft 43 screws into the housing 52, as shown in Figure 5.

It will be evident that the shaft 53 and housing 52 are constantly rotated at the same speed as the shaft 39, which has a fixed R. P. M. due to the motor drive 35. As long as the shafts 39 and 43 are rotating at the same R. P. M., there will be no threading action of the head 54 into the housing 52. Any variation in the R. P. M.'s of the shafts 39 and 43 will cause the head 54 to screw into or out of the housing 52 thus imparting a longitudinal movement to the shaft 53. The shaft 53 closely fits a counterbore 55 in the end of the shaft 43, which acts as a check or dash pot for the housing 52. A duct 56 in the shaft 43 permits oil to pass into and out of the counterbore 55. The shaft 53 butts against or is suitably attached to the post 57 of the valve 58. This valve is preferably of a suitable gate type so that longitudinal movement of the post 57 will cause the valve to be either opened or closed. The valve 58 controls the driving fluid which passes into the driving engine of the pump (not shown).

In operation, the steam pump is being driven, and consequently the arm 42 is reciprocating at each stroke of the pump. The motor 35 is started and, assuming first that the shaft 39 driven at a constant speed by the motor 35 is rotating at the same speed as the shaft 43, which is driven by the rack 40 as the pump reciprocates, through the unidirectional clutches 45 and 47, the shaft 43 will be constantly rotated in one direction. Through the gears 50 and 51, the housing 52 will rotate in the same direction as the shaft 43. As long as the speeds of the housing 52 and shaft 43 are the same, the head 54 will not tend to move into or out of the meshing threads in the housing 52. If the pump slows down, the R. P. M.'s of the shaft 43 will decrease. Since the housing 52 maintains its previous R. P. M., the head 54 will tend to screw into the housing 52. This action of the head 54 will tend to move the housing 52 downwardly as viewed in Figure 5. Since the trunnion 53 is suitably attached to the post 57 of the valve 58, this downward movement of the trunnion 53 will open the valve 58, causing the pump engine to increase its speed, thereby increasing the reciprocation of the pump until the speeds of the shaft 39, housing 52, and shaft 43 are synchronized. An increased speed of the pump will have the opposite effect to that previously described.

Having described my invention, I claim:

In a speed controlling device a frame, a shaft rotatably mounted on said frame, a second shaft rotatably mounted on said frame and spaced transversely from the first shaft, means for transmitting rotary motion from the first shaft to the second shaft, unidirectional clutches carried by said shafts, a rack slidable longitudinally on the frame transversely of the shafts and engaging said clutches to rotate the same during reciprocation of the rack, said rack rotating one clutch when moved longitudinally in one direction and rotating the other clutch when shifted longitudinally in an opposite direction, said clutches and the first shaft cooperating with each other to effect constant turning of the second shaft in the same direction, a member in threaded engagement with the second shaft, means for rotating said member at a constant speed and control means associated with said member, said control means being shifted longitudinally of the second shaft by action of the threaded connection of said member with the second shaft due to difference in speed between rotation of the second shaft and the said member.

THOMAS W. DWELLE.